United States Patent [19]

Massmann

[11] Patent Number: 5,097,521

[45] Date of Patent: Mar. 17, 1992

[54] METHOD OF CONCEALING SCRATCH ERRORS IN A VIDEO SIGNAL DERIVED FROM A FILM SCANNER

[75] Inventor: Volker Massmann, Ramstadt, Fed. Rep. of Germany

[73] Assignee: BTS Broadcast Television Systems GmbH, Darmstadt, Fed. Rep. of Germany

[21] Appl. No.: 625,855

[22] Filed: Dec. 11, 1990

[30] Foreign Application Priority Data

Dec. 21, 1989 [DE] Fed. Rep. of Germany ....... 3942273

[51] Int. Cl.$^5$ .............................................. G06K 9/00
[52] U.S. Cl. ........................................ 382/54; 358/36; 358/167
[58] Field of Search ................... 382/54; 358/167, 163, 358/336, 36, 37, 136

[56] References Cited

U.S. PATENT DOCUMENTS

| | | | |
|---|---|---|---|
| 4,716,565 | 12/1987 | Suma | 358/314 |
| 4,807,033 | 2/1989 | Keesen et al. | 358/36 |
| 4,941,186 | 7/1990 | Massmann et al. | 382/54 |
| 4,987,481 | 1/1991 | Spears et al. | 358/36 |

FOREIGN PATENT DOCUMENTS

2140245A 11/1984 United Kingdom .

Primary Examiner—David K. Moore
Assistant Examiner—Yon Jung
Attorney, Agent, or Firm—Frishauf, Holtz, Goodman & Woodward

[57] ABSTRACT

Film scratches that produce errors in video signals produced by a film scanner generally run vertically over one or more moving picture frames and are particularly troublesome where they are intersected by picture contours, i.e. oblique boundaries between light and dark picture content. For concealing the disturbance produced by film scratch in such a case the course of a picture contour across the scratch is determined. First the pixel values before and after a television line crosses the scratch are compared line by line, with simple interpolation inbetween if the difference found is slight. In other cases the direction of rise of an oblique picture contour crossing the scratch is determined and the pixel coordinates of the entrance and exit of the contrast edge into and out of the scratch are generated and stored, while at the same time the pixel values at the edge opposite the entry and exit are also stored. When the pixel values at opposite sides of the scratch are again equal the other end of the crossing of the scratch by the picture contour has been reached, the position of the picture contour across the scratch is determined when the contour transition point in each line is calculated for controlling the concealment of the scratch disturbance.

7 Claims, 4 Drawing Sheets

METHOD OF CONCEALING SCRATCH ERRORS IN A VIDEO SIGNAL DERIVED FROM A FILM SCANNER

This inventions concerns a method of concealing errors in a video signal resulting from television film scanning which are caused by film scratches extending in an essentially vertical direction in the neighborhood of an oblique edge intersecting the film scratch which defines the boundary between mutually contrasting areas of the picture content.

For the concealment of error areas in a video signal an error signal is conventionally generated by a suitable recognition circuit for delivering information of the position and size of the error location, as disclosed, for example, in British published patent application 2,140,245A. Such a signal makes it possible to replace the disturbed areas of the picture with information derived from previously transmitted portions of the video signal. If the video signal is from a film scanner, the preceding lines and frames may be disturbed at corresponding locations by vertically running scratches, making the reference to earlier lines or picture fields of little value. Furthermore, the previously known procedure is unsuitable when the picture content of the previous picture frame is not identical with the current picture frame at the particular location, for example in the case of movement in the picture or a change of scene.

For avoiding the above-described disadvantages, it is known from European Patent 0 101 180 to utilize the signal derived from the error location to initiate an interpolation between two undisturbed pixels at boundaries of the error location and thereby to conceal the error location. Especially in the case of broad scratches in a film, however, this interpolation method has the disadvantage that the interpolated zone is emphasized amid the remaining picture content, because it occupies a fixed position in the picture for a perceptible time interval. Furthermore, in such cases oblique edge features of the picture content are interrupted over the width of the scratch and perpendicular edges of picture content are horizontally smeared. If the error location signal is slightly narrower than the error location itself, that leads to erroneous interpolation that can be just as disturbing as the disturbance it is intended to conceal.

In U.S. Pat. No. 4,941,186 a method of concealing errors in a video signal is described by which the above-mentioned effects of a simple interpolation can be greatly reduced by a partial expansion and filtering. When there are movements in the picture content affecting large areas, however, these partially expanded and filtered regions can still be visible if they are produced by scratches on a scanned film, because they remain fixed in location while the surrounding picture content moves.

SUMMARY OF THE INVENTION.

It is an object of the present invention to provide a method of error concealment by which disturbances produced by film scratches in the neighborhood of oblique picture content lineaments or boundaries intersecting the scratch are made no longer visible in a video signal.

Briefly, when an error area is found in a line, the respective pixel values preceding the first edge and following the last edge are compared line by line to produce pixel value differences. When these pixel value differences (pvd) are small, simply interpolated pixel values are substituted for pixels in the disturbed area. When the pixel value difference (pvd) is large the polarity (dexter or sinister slope) of an oblique edge pictorial feature is determined from the sign of the difference and the change from a preceding small pvd line. A polarity signal is then produced for use in determining a transition point between pre-scratch and post-scratch pixel values. The pixel coordinates are then generated for designating the beginning and the end of a scratch region in the line in which the investigated oblique edge feature enters into the scratch, as follows. The pixel coordinates and the pixel value at the entrance of that edge feature into the scratch are compared with the same data of contemporary pixel in the same line at the opposite side of the scratch. The value comparison is done for following lines. In the event that last comparison shows equality of pixel value, an edge transition line is recorded as terminating in one of these pixels of equal value. The pixel coordinates of the scratch edge both at the beginning and the end of the error location, as seen in horizontal direction, are then stored. Then, with the help of the oblique edge transition line that has thus been located, interpolation (actually extrapolation to edge transition) is performed on both sides of that oblique line in the horizontal direction of all the television lines affected.

The method of the invention has the advantage that contours that are missing in a scratched area are reconstructed so that the darkness of the picture is essentially maintained in the region of a scratch.

BRIEF DESCRIPTION OF THE DRAWINGS

Further details of the invention can best be understood in connection with the further description that follows and refers to the annexed drawings, in which.

DESCRIPTION OF THE ILLUSTRATED METHOD.

Figure 1:
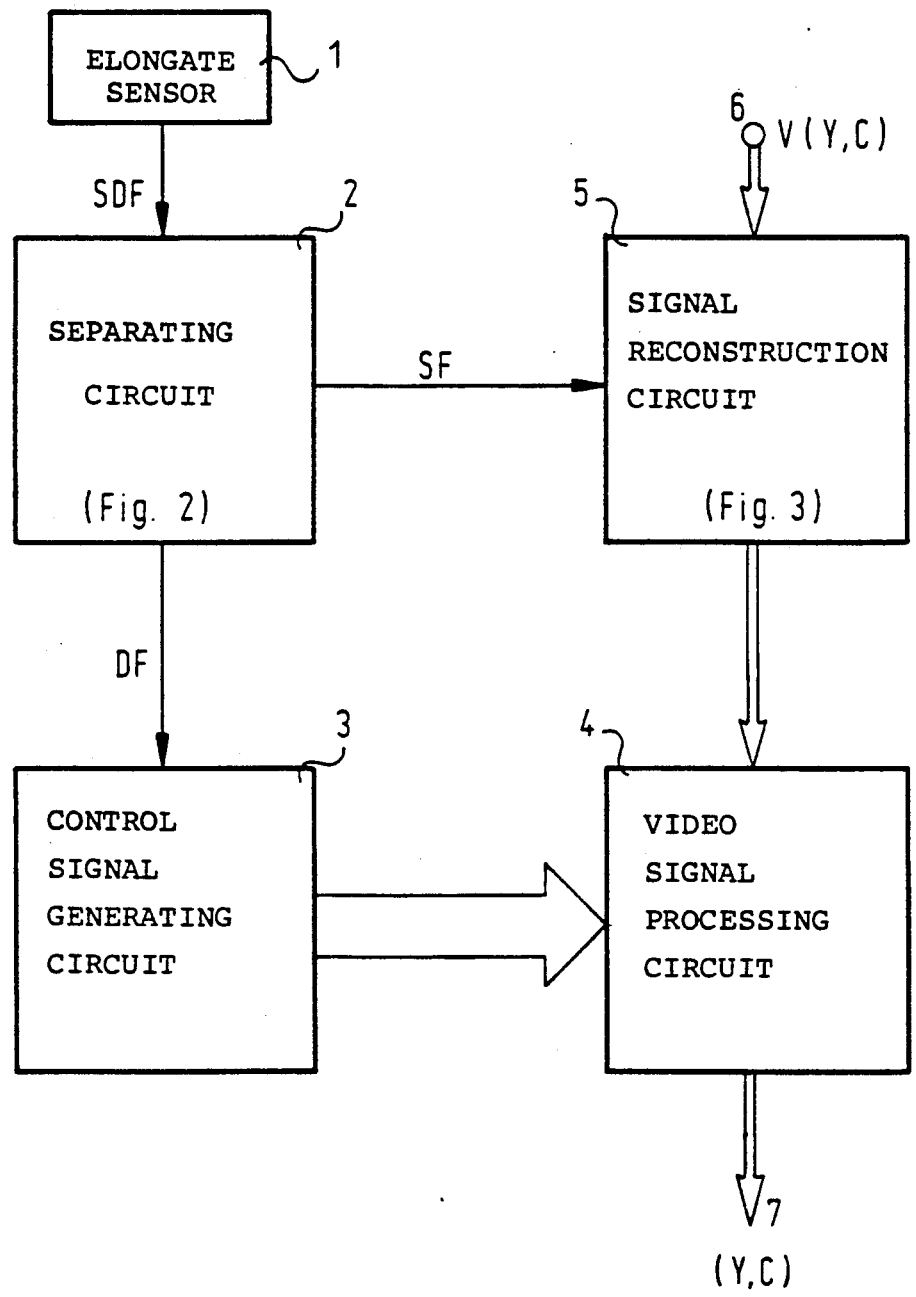
FIG. 1 is block circuit diagram of the overall arrangement of equipment useful for error concealment in a video signal in accordance with the invention.

In the overall equipment group shown in FIG. 1 for concealing errors in a video signal there are generated error signals produced by the presence of dust or scratches by means of an infra-red sensitive optoelectrical converter, in the illustrated case a line-shaped semiconductor sensor 1, during television scanning of a motion picture film. This error location signal SDF furnished by the sensor 1 designates a signal classification that includes both error signals SF generated by scratches and error signals DF produced by dust specks. In a following separating circuit 2, the output of sensor 1 is split into a scratch detection signal SF and a dust detection signal DF. The separating circuit 2 is shown in more detail in FIG. 2 and is further explained below. The dust signal DF is supplied to a control signal generating circuit 3 in which control signals are derived for the following video signal processing circuit 4. The manner of operation of the circuit 3 and 4 are already described in U.S. Pat. No. 4,941,186, so that these circuits 3 and 4 of the present description do not need to be further discussed here. The scratch signal SF separated by the separation circuit 2 is supplied to a signal reconstruction circuit 5 which will be further explained with reference to FIG. 3. At the input 6 of the circuit 5 a video signal is also supplied which consists of a luminance component Y and a chrominance component C. The video signal is first freed from scratch-originated disturbances in the circuit 5 and then freed of dust-generated disturbances in the circuit 4. At the output 7 of the circuit 4 a video signal freed of both these kinds of disturbances is then made available.

Figure 2:
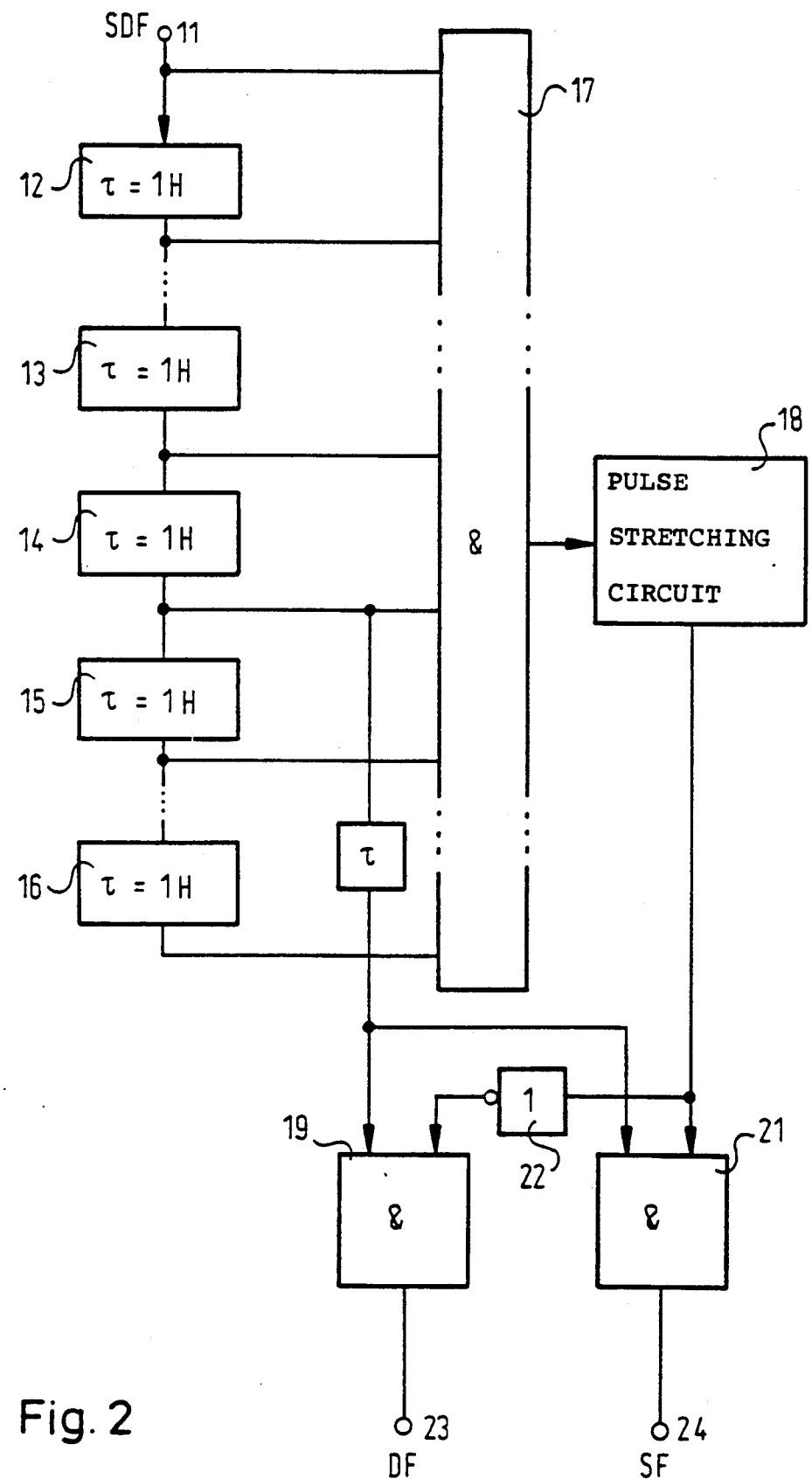
FIG. 2 is a circuit block diagram of apparatus for splitting the error signal into two different error location signals corresponding to different error sources.

As already mentioned, FIG. 2 shows the nature of the separation circuit 2 of FIG. 1. The SDF signal is supplied to an input 11 and is supplied thereto through a number of line memories of which only five line memories 12–16 are shown in the figure. The outputs of the line memories are supplied to an AND gate 17, in which the pixel-specific signals are correlated to produce a single output signal. At the output of the AND gate 17 a pulse stretching circuit 18 is connected in which the input signal is widened, in an essentially symmetrical manner, in order to cover possible situations in the position of a scratch. By means of the resulting control pulse signal the SDF input signal is split into a DF signal and an SF signal by means of two AND gates 19 and 21 to which the control pulse signal is applied in opposite polarity, being inverted by the inverter stage 22 for supply to the AND gate 19 for generating the dust error signal DF. As already mentioned that dust signal DF available at the output 23 is usable in a known way for carrying out error concealment by interpolation of expansion in accordance with the disclosure of U.S. Pat. No. 4,941,186. The SF signal made available at the output 24 is used for reconstruction of oblique picture content edges in the picture signal in accordance with FIG. 3.

Figure 3:
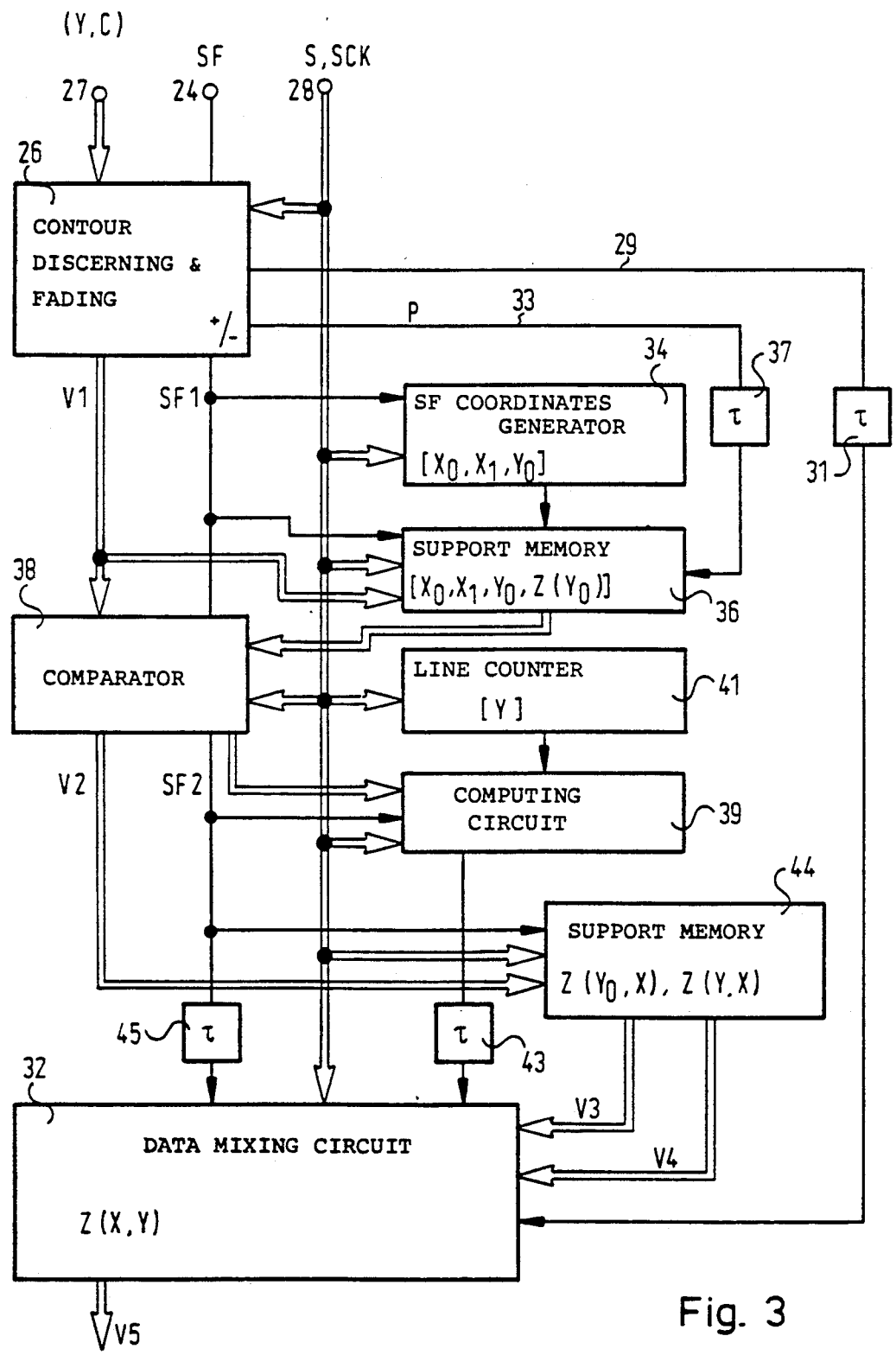
FIG. 3 is a circuit block diagram of apparatus for error concealment in a video signal when the scratch signal has been generated.

A contour-discerning circuit 26 is provided in the circuit shown in FIG. 3, at the first input of which the scratch error signal SF is supplied from the terminal 24, while at the second input of the circuit 26 the digital video signal Y, C is provided from the terminal 27. The circuit 26 has timing inputs to which the synchronizing signal S consisting of H and V signals and also a clock signal SCK are delivered from the terminal 28. In the contour-discernment circuit 26 the pixels of the video signal before the beginning of the scratch signal SF and after its end are compared line by line with each other. If the boundary pixel values differ only slightly from each other, a signal is supplied over the connection 29 which is supplied to one input of a data mixing circuit 32 equipped with an interpolator after passing through a propagation time equalizing circuit for delay line 31. In such a case only an interpolation between the particular edge pixel values is carried out. If on the other hand a large level difference between pixels before and after the scratch is found by the circuit 26, a signal designating the slope polarity P of the oblique edge is produced and delivered to the connection 33.

A circuit 34 for generating SF coordinates is provided in which the coordinates of the scratch signal SF1, which differs from the signal SF merely by a difference in timing resulting from propagation time are determined in the X and Y directions. These coordinates are determined by the momentary condition of two counters in the circuit 34 controlled by the S signal and the pixel rate signal SCK, as a result of interrogating the counters. The pixel coordinates of the scratch signal SF1 are then stored, together with the corresponding pixel value or level of the video signal V1, in a first support value memory 36. In this memory 36 there is also stored the signal of slope polarity P obtained from the connection 33 and an intermediate propagation time equalizing component 37. According to the particular slope polarity, either the left or right scratch edge value is used as the support value. The slope in question relates to the slope of the boundary (dexter or sinister in the Heraldry sense) rather than to the direction of change of luminance across the boundary. The heraldry term dexter means a slope which as viewed tips downward to the right, while sinister means downward to the left. The output of the support value memory 36 is connected with one input of the comparator 38, to the second input of which the contemporary (real time) video signal V1 is supplied.

In the comparator 38 the stored pixel value from one side of the scratch is compared in every line with the pixel value on the other side of the scratch. In the case of equality of these values, i.e. in the case of the lower passage of the oblique edge of picture content of the video signal through the scratch edge, the complete set of coordinates for calculating the transition point is now available and is stored in the computing circuit 39 which receives for its control and operation the timing signals S and SCK and the output of a line counter 41. The scratch signal SF2 (propagation time again adjusted) is also supplied to the computing circuit 39. The output of the computing circuit 39 is supplied through still another propagation time equalizing component 43 to one input of the data contour fading circuit 32. Contour fading means providing continuity through a transition without appreciable loss of contour sharpness. The pixel values of the scratch edge which were taken from the delayed video signal V2 by the comparator 38 are supplied to a second support value memory 44 and there stored. These are now available in parallel to the contour fading circuit 32. The support memory 44 delays a video signal V2 by a fixed interval of time. This time determines the maximum recognizable edge steepness. At other inputs of the contour fading circuit 32 there are provided the video signals V3 and V4 supplied by the support value memory 44, of which V3 always is the video signal of the left-hand scratch edge and V4 the signal of the right-hand scratch edge. If there is no scratch, V4 always corresponds to the normal video signal V2. When there are scratch disturbances, contour fading is provided between the signals V3 and V4.

The support value memory 44 must be supplied with the timing signals S and SCK as well as with the scratch signal SF2. These signals are also available to the contour fading circuit 32, with regard to which the scratch signal SF2 is led through still another propagation time compensation component 45.

In connection with the state of the line counter 41, the contour transition point that is different from line to line can now be determined with reference to the undisturbed picture data to the left and right of the scratch. The contour fading is provided by at least two pixels. In the case of relatively steep or almost perpendicular contours the transition point is located for many or all lines of a frame in or near the middle of the scratch.

Figure 4:
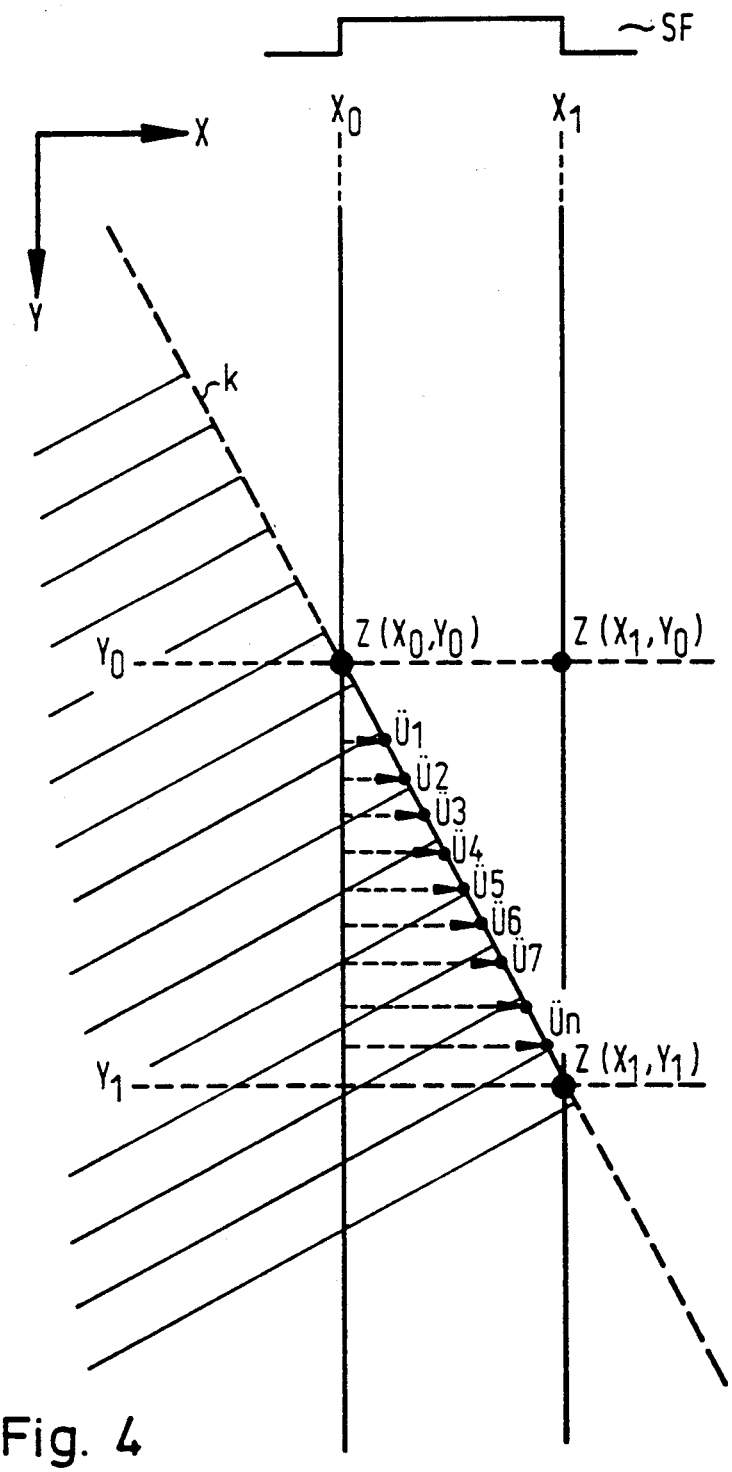
FIG. 4 is a diagram for explaining the reconstruction of picture information in accordance with the invention by means of the circuit of FIG. 3 in the region of a detected scratch.

FIG. 4 shows the so-called pulling stripe type of scratch having the boundaries $x_0$ and $x_1$ and intersected by an oblique edge k in one part of a film picture, here shown on a magnified scale. Pulling stripes extend generally in a vertical direction mostly over a complete film picture, move substantially parallel to the edge of the film and vary only slightly in width. The oblique edge k is for example the boundary between a dark picture portion at the left and a bright picture portion at the right of k. This edge k enters into the scratch at a height of $y_0$ through the boundary $x_0$ and exits from the scratch at the height of $y_1$ through the boundary $x_1$ of the scratch. Consequently the passage coordinates of the edge k through the scratch are $x_0$, $y_0$ and $x_1$, $y_1$. By means of the method of the present invention, the portion of the edge k between these coordinates $x_0$, $y_0$ and $x_1$, $y_1$, therefore the missing portion of the edge, will now be reconstructed by means of the method of the invention. This can take place for example with the circuit according to FIG. 3 for carrying out the method of the invention.

For that purpose it is first necessary to determine the direction of the rise of the edge in the picture, i.e. the steepness polarity P. Then there will be carried out for example a comparison between the line signals previous to entry and with the entry of the edge k into the scratch. Then the coordinates $x_0$, $y_0$ of the entry as well as the corresponding pixel value, i.e. the signal level, are determined. Finally, the exit coordinates $x_1$, $y_1$ and likewise the corresponding pixel value are to be determined. On the basis of these data there can now be calculated in every line the corresponding contour fading transition point $U_1, U_2 \ldots U_n$.

Outside of the scratch, of course, the contemporary video signal will be transmitted as usual.

Although the invention has been described with reference to a particular illustrative example, it will be understood that variations and modifications are possible within the inventive concept.

I claim:

1. A method of concealing errors in a video signal resulting from television film scanning, which are caused at an oblique edge pictorial feature of the video signal by film scratches extending in an essentially vertical direction, comprising the steps of:
   (a) comparing with each other line by line the respective pixel values preceding the first edge and following the last edge of a scratch and thereby producing pixel value differences;
   (b) in the case of a small pixel value difference, merely performing interpolation of pixel values between said scratch edge pixel values and substituting interpolated pixel values for pixels in the scratch region of a line;
   (c) in the case of a large pixel value difference
   (i) determining the polarity of said oblique edge pictorial feature and producing therefrom a polarity signal for use in determining a contour transition point between pre-scratch and post-scratch pixel values, said values being in each case a non-scratched value;
   (ii) then generating pixel coordinates designating the beginning and the end of a scratch region in the line in which said oblique edge feature enters into the scratch;
   (iii) then comparing, by reference to pixel coordinates on a line, the pixel value at the entrance of said edge feature into the scratch with the pixel value on the same line outside the scratch at the opposite side of the scratch;
   (iv) in the event of equality in pixel values in substep (ii), reporting an edge transition line as terminating at a location defined by these pixels of equal value;
   (v) storing the pixel values of the scratch edge both of the beginning of the error location and of the end of the error location as seen in the television scanning line direction for a succession of television scanning lines intersecting said edge transition line, and
   (vi) interpolating between pixel values stored in accordance with (v) with the help of determination of the edge transition line found to be terminated at a location found in (iv).

2. The method of claim 1, wherein both said pixel coordinates generated according to (c) (ii) and the pixel values pertinent thereto, as well as said polarity signal produced in accordance with (c) (i) are temporarily stored prior to the substep of comparing pixel coordinates in a line and the pixel value at the entrance of said edge feature into the scratch with the contemporary pixel value at the opposite side of said scratch.

3. The method of claim 1, wherein in substep (iv) the coordinates of said pixel values found equal are temporarily stored for determining a contour transition point in other lines.

4. The method of claim 1, wherein said each error location produced by disturbed pixels is examined for detecting an error caused by a film scratch and a corresponding signal designating the presence or absence of a scratch error is derived from the result of the examination.

5. The method of claim 4, wherein the generation of said signal (SF) designating the presence or absence of a scratch error is implemented by performing a first AND correlation (21) of pixels of an error location signal (SDF) delayed by a plurality of line periods and a second AND correlation (17) of differently linewise delayed pixels of the error location signal (SDF) for deriving a control pulse signal.

6. The method of claim 5, wherein said control pulse signal is symmetrically widened and then applied to said first AND correlation (21).

7. The method of claim 5, wherein, in addition to the scratch error signal (SF), a dust error signal (DF) is derived from said error location signal (SDF) by a third AND correlation (19) of said pixels of said error location signal (SDF) delayed by a plurality of line intervals with a signal obtained from said control pulse signal by inverting said control pulse signal.

* * * * *